Aug. 4, 1925.
R. C. CLINKER
ELECTRICAL INSTRUMENT
Filed Jan. 29, 1921
1,548,660
2 Sheets-Sheet 1
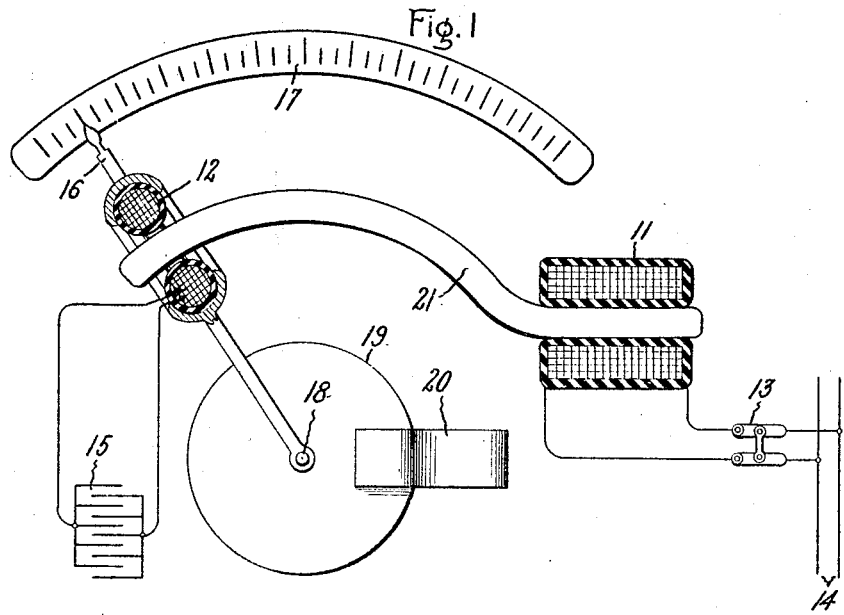
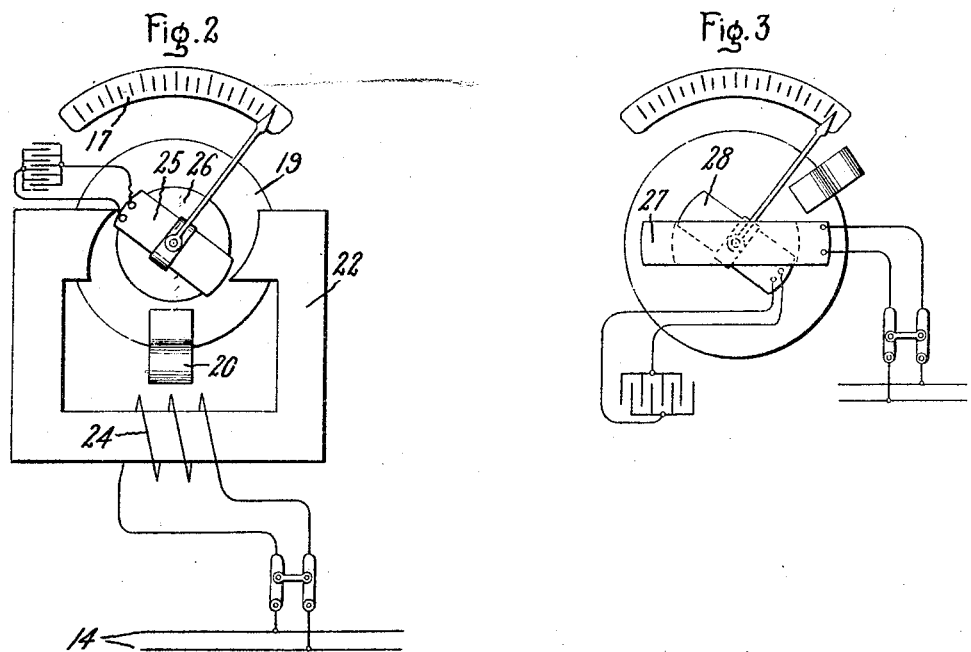
Inventor:
Reginald C. Clinker,
by Albert G. Davis
His Attorney.

Aug. 4, 1925.
R. C. CLINKER
ELECTRICAL INSTRUMENT
Filed Jan. 29, 1921
1,548,660
2 Sheets-Sheet 2
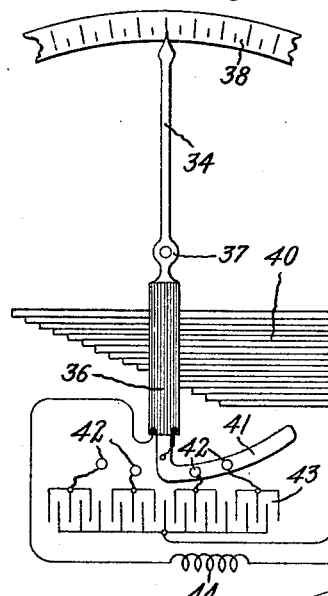
Fig. 6
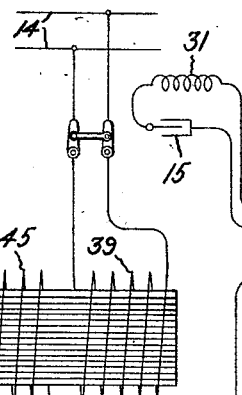
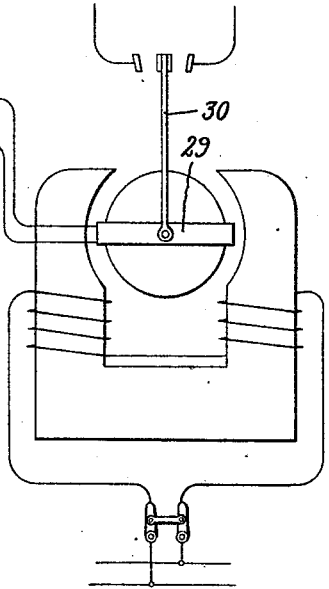
Fig. 4
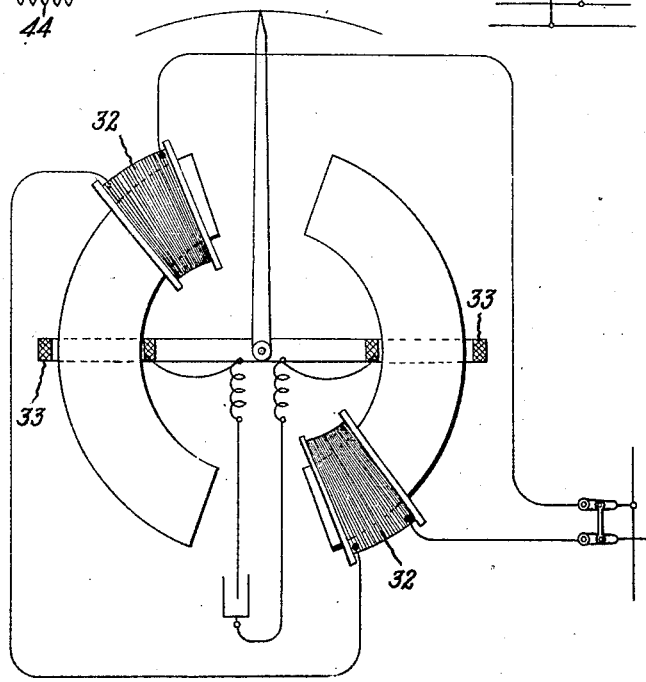
Fig. 5
Inventor:
Reginald C. Clinker,
by Albert G. Davis
His Attorney.

Patented Aug. 4, 1925.

1,548,660

UNITED STATES PATENT OFFICE.

REGINALD C. CLINKER, OF RUGBY, ENGLAND, ASSIGNOR TO GENERAL ELECTRIC COMPANY, A CORPORATION OF NEW YORK.

ELECTRICAL INSTRUMENT.

Application filed January 29, 1921. Serial No. 441,064.

*To all whom it may concern:*

Be it known that I, REGINALD CHARLES CLINKER, a subject of the King of Great Britain, residing at Rugby, in the county of Warwickshire, England, have invented certain new and useful Improvements in Electrical Instruments, of which the following is a specification.

This invention relates to electrical instruments, and more particularly to instruments for measuring electrical values, such as frequency, capacity, or inductance.

It is the main object of my invention to provide an indicating instrument to show the instantaneous value of the frequency of an electrical circuit. Although instruments for performing this function are already well known, my instrument operates on a substantially new principle, and due to the utilization of this principle the construction of the instrument is greatly simplified. Other objects and advantages of my invention will become apparent as the description proceeds. For a better understanding of my invention reference is to be had to the following specification, together with the accompanying drawings, in which Fig. 1 illustrates one embodiment of my invention, while Figs. 2, 3, 4, 5 and 6 show various modifications.

Referring now more in detail to the drawings, in which like reference characters refer to like parts throughout, I show in Fig. 1 an indicating instrument comprising a pair of coils 11 and 12, one of which, such as 12, is movable with respect to the other. One of the two coils is adapted to be connected as by means of switch 13 to a source of current 14, the frequency of which is to be measured. The coil 12 is close-circuited through a condenser 15, and furthermore carries a pointer 16 coacting with a stationary scale 17. The spindle 18 carrying the coil 12 and pointer 16 is not restrained in any way but in order to prevent excessive vibrations a damping disc 19 and damping magnet 20 may be provided. A core 21 is provided for both of the coils 11 and 12, which core is so shaped that rotation of spindle 18 and corresponding movement of coil 12 is permitted, so that the mutual inductance of the two coils 11 and 12 may be varied.

It is found that with an instrument such as described, upon a variation in frequency, the coil 12 will take up a new position corresponding with the new frequency. In other words, the position of the coil 12 is a function of the frequency. This phenomenon may be explained on the principle that when there are parallel wires carrying currents, then if they carry currents in the same direction there is a force tending to move them together, while if they carry currents in the opposite direction, there is a force tending to move them apart. This fundamental principle is utilized in the present invention. The movement of coil 12 has the effect of varying the relation between the mutual induction of coils 11 and 12 and their self induction. Thus, upon movement of the said coil 12 toward coil 11, the mutual induction is increased and self induction of both coils is reduced. A movement in the other direction gives reverse effects. There is one point somewhere in the path of movement of coil 12 where the relations between the mutual induction and the self induction is such that the average force as the current goes through its periodic values, reduces to zero, and the coil remains stationary. This is due mainly to the fact that the induced electromotive force in coil 12 supplies a leading load which in this instance comprises the condenser 15. If the mutual induction is increased between the two coils, then the effect of the leading current upon the primary circuit is correspondingly increased, since the induced electromotive force of coil 12 is increased and therefore the secondary current therethrough.

Assume that the movable coil 12 is in a definite position on core 21. The current through coil 12 is leading its electromotive force, while the current through coil 11 may be either leading or lagging as regards the electromotive force impressed on coil 11, depending upon the value of the mutual induction. The forces acting between the two coils may be averaged from instant to instant as the values of the currents change periodically. The value of the average force depends mainly upon the phase relation between the two currents. Thus if they are about opposite in phase, the average force is a force of repulsion, while if they are nearly in phase, it is one of attraction. Somewhere in between, when the phase of the currents differ by something like 90°, the average force vanishes, and the coil stays where it happens to be at that time. Should conditions be such that the average force is one of attraction, the mutual induction is increased by movement of the coil, until the attractive force is reduced to zero. The reverse effect is obtained when the initial position of the movable coil causes a repulsive force. Since the amount of lead or lag of the currents is directly dependent upon the frequency, it is seen that the position of the coil may be taken to represent this value. It is found that good results can be had and a fairly open scale is obtainable when the capacity of the condenser 15 is adjusted so as to make the circuit of the coil and the condenser about resonant within the range of frequency over which it is desired to measure. Furthermore, voltage fluctuations impressed upon the stationary coil have been found to produce negligible effects.

Fig. 2 illustrates a modification which, however, operates substantially as the modification shown in Fig. 1. The difference in this case is that the magnet core 22 which forms a part of the magnetic circuit for both the stationary coil 24 and the movable coil 25 is bent up to form a U-shaped structure, between the pole faces of which is pivoted the movable coil 25. This movable coil 25 may be wound on an appropriate core 26. In order to produce a sufficiently large variation in the mutual and self induction of the two coils, the pole faces may be shaped in any appropriate manner; for example, as shown in this modification. It is evident that upon rotation of the coil 25 in a counterclockwise direction the mutual induction is reduced, while movement in the other direction causes an increase in the mutual induction.

Fig. 3 shows another modification in which the stationary and movable coils 27 and 28 are placed concentrically with respect to each other. It is evident here also that movement of coil 28 causes a corresponding variation in the mutual and self inductions of the coils.

Fig. 4 shows another modification in which the movable coil 29 carries a contact making arm 30 instead of a pointer as shown in the other modifications. This may be utilized for operation as a relay or as a contact making instrument in a manner well understood. I have also shown in this modification a reactance coil 31 in series with the condenser 15 which are both placed across the terminals of the movable coil 29. This may be of use to control the extent of the scale deflections.

Fig. 5 shows another modification corresponding to a double arrangement of coils but operating substantially like the modification shown in Fig. 1. In this case there are two stationary coils 32 and two movable coils 33. The operation of this modification is self evident from the drawing.

Fig. 6 shows a possible modification in which the scale of the instrument may be made anything desired. In this case the pointer 34 carried by the pivoted coil 36 having a spindle 37 coacts with the stationary scale 38. The stationary coil 39 is supplied from the source 14 as in the other modifications. In order to control the rate at which the self induction is varied by rotation of the movable coil 36, it is possible to shape appropriately the common magnetic core 40, in this case shown as made up of a plurality of laminations, each succeeding lamination being of slightly different length so as to give a graded effect. Further to modify the indications, it is possible to arrange matters so that movement of the coil 36 causes a corresponding variation in the capacity of the condenser connected to the coil. This is effected by means of the contact 41 carried at one extremity of the coil coacting with the stationary contacts 42. These contacts connect to unit condensers 43 so arranged that more and more of them become active upon rotation of the coil 36 in a clockwise direction. It is also possible to connect a reactive coil 44 in series with the condensers as well as a supplementary coil 45 wound over or near the stationary coil 39 into the circuit of the movable coil 36. By proper adjustment of these various elements it is possible to get almost any kind of scale desired.

While I have illustrated my invention as applied to the measuring of frequency, it is evident that I may use it for comparing the capacities of condensers or the inductions of coils. The condensers to be compared may be connected across the terminals of the movable coil and the deflection for each of them noted. The same procedure may be had for the comparison of the inductance of coils.

While I have shown in the accompanying drawings preferred embodiments of my invention, I do not wish to be limited thereto but aim to embrace in the appended claims all modifications falling fairly within the scope of my invention, and where in the appended claims a condenser is specified, I mean to include any equivalent device for producing similar effects.

What I claim as new and desire to secure by Letters Patent of the United States, is,—

1. An electrical instrument comprising primary and secondary relatively movable independently connected coils in inductive relation to each other, said secondary coil being closed circuited, and a condenser included in said closed circuit.

2. An electrical instrument comprising primary and secondary relatively movable coils in inductive relation to each other, a core providing a portion of the magnetic circuit for both coils, a condenser and a supplementary secondary coil completing the circuit of one of said relatively movable coils.

3. An electrical instrument comprising a fixed primary coil, a magnetic core for said coil, a movable secondary coil in inductive relation to the fixed coil, surrounding said core, a condenser and a supplementary secondary coil in series with the movable coil, said movable coil being so arranged that movement thereof changes its self induction.

4. An electrical instrument comprising a fixed coil, a magnetic core for said coil, a movable coil in inductive relation to the fixed coil, surrounding the magnetic core, a condenser connected in series with said movable coil, and means for varying the capacity of said condenser in response to changes in position of the coil.

5. An electrical instrument comprising a pair of relatively movable coils in inductive relation to each other, a core providing a portion of the magnetic circuit for both coils, and a condenser in series with one of said coils and completing its circuit, said magnetic core being so constructed and arranged that the inductance of the coil changes with its movement in accordance with a fixed law.

6. An electrical instrument comprising a pair of relatively movable coils in inductive relation to each other, one of said coils being closed circuited, and a condenser included in said closed circuit, so arranged that its capacity is changed upon a change in the relative position of the coils.

7. An electrical instrument comprising a pair of relatively movable coils in inductive relation to each other, one of said coils having its circuit closed by an impedance, and means whereby said impedance is varied in response to the movement of the coil.

In witness whereof I have hereunto set my hand this third day of January, 1921.

R. C. CLINKER.

Witnesses:
J. A. FOSTER,
D. WHITE.